US010882559B2

(12) United States Patent
Gündogan

(10) Patent No.: US 10,882,559 B2
(45) Date of Patent: Jan. 5, 2021

(54) SUPPORT STRUCTURE FOR A VEHICLE

(71) Applicant: Kirchhoff Automotive Deutschland GmbH, Attendorn (DE)

(72) Inventor: Aydogan Gündogan, Plettenberg (DE)

(73) Assignee: KIRCHHOFF AUTOMOTIVE DEUTSCHLAND GMBH, Attendorn (DE)

(*) Notice: Subject to any disclaimer, the term of this patent is extended or adjusted under 35 U.S.C. 154(b) by 71 days.

(21) Appl. No.: 16/325,803

(22) PCT Filed: Oct. 5, 2017

(86) PCT No.: PCT/EP2017/075315
§ 371 (c)(1),
(2) Date: Feb. 15, 2019

(87) PCT Pub. No.: WO2018/065510
PCT Pub. Date: Apr. 12, 2018

(65) Prior Publication Data
US 2019/0185060 A1 Jun. 20, 2019

(30) Foreign Application Priority Data
Oct. 6, 2016 (DE) .................. 10 2016 118 952

(51) Int. Cl.
B62D 21/11 (2006.01)
B62D 25/20 (2006.01)
(52) U.S. Cl.
CPC ............. B62D 21/11 (2013.01); B62D 25/20 (2013.01)
(58) Field of Classification Search
CPC .................. B62D 21/11; B62D 25/20
(Continued)

(56) References Cited

U.S. PATENT DOCUMENTS 8,950,794 B2 2/2015 Lenkenhoff
9,446,799 B2 9/2016 Franzpötter
(Continued)

FOREIGN PATENT DOCUMENTS

DE 202012104070 U1 1/2013
JP H0254681 U 4/1990
(Continued)

OTHER PUBLICATIONS

International Search Report dated Apr. 12, 2018 in parent application PCT/EP2017/075315.
(Continued)

Primary Examiner — Joseph D. Pape
Assistant Examiner — Dana D Ivey
(74) Attorney, Agent, or Firm — Polson Intellectual Property Law, PC; Margaret Polson

(57) ABSTRACT

The present disclosure relates to a support structure (1) for a vehicle, comprising a support (2) which has an upper shell (3) and a lower shell (4), the extension of the support structure in the longitudinal extension of the vehicle being defined by the extension of the two shells (3, 4) in said direction, and comprising attachment points (14, 14.1) for connecting a link (27). A front attachment point and a rear attachment point are provided on each link attachment side (9, 9.1). The two attachment points (14, 14.1) are provided for an attachment insert (10) on each link attachment side (9, 9.1) of the support (2), wherein the attachment insert is connected to the shells (3, 4), is open towards a link (27) to be connected to the attachment points at least in the region of the attachment points (14, 14.1), and is produced as a separate component. This attachment insert has an upper chord (11), a lower chord (12), and a back section (13) connecting the upper chord (11) to the lower chord (12), wherein the upper chord (11) of the attachment insert (10) is
(Continued)

connected to the upper chord (11) of the support (2), and the lower chord (12) of the attachment insert (10) is connected to the lower shell (4) of the support (2), wherein link connection part receivers (17, 17.1) provided by the attachment insert (10) are separated from the support (2) cavity located between the upper and the lower shell by the back section (13).

20 Claims, 4 Drawing Sheets

(58) Field of Classification Search
USPC .................................................. 296/193.07
See application file for complete search history.

(56) References Cited

U.S. PATENT DOCUMENTS

| | | | |
|---|---|---|---|
| 9,598,100 | B2 | 3/2017 | Lenkenhoff |
| 9,764,764 | B2 | 9/2017 | Irle |
| 10,005,495 | B2 | 6/2018 | Töller |
| 10,577,025 | B2 | 3/2020 | Michler |
| 2012/0319389 | A1 | 12/2012 | Takahashi et al. |
| 2014/0265442 | A1 | 9/2014 | Makino et al. |
| 2017/0190361 | A1* | 7/2017 | Chen .................. B62D 21/02 |

FOREIGN PATENT DOCUMENTS

| | | | |
|---|---|---|---|
| JP | 2005289115 A | | 10/2005 |
| JP | 2014118093 A | * | 6/2014 |
| JP | 2014118093 A | | 6/2014 |

OTHER PUBLICATIONS

International Preliminary Report on Patentability, Chapter II dated Aug. 22, 2018 in parent application PCT/EP2017/075315.

* cited by examiner

SUPPORT STRUCTURE FOR A VEHICLE

BACKGROUND

The present disclosure relates to a support structure for a vehicle comprising a support which has an upper shell and a lower shell, the extension of the support structure in the longitudinal extension of the vehicle being defined by the extension of the two shells in said direction, and comprising attachment points for connecting a link, wherein a front attachment point and a rear attachment point are provided on each link attachment side.

In vehicles, for the construction of the chassis, different frame structures are used, which are also arranged hierarchically with respect one another. Such frame structures can be auxiliary frames, for example, which are suspended on the vehicle side and connected by articulation to the link of the wheel suspension. Such supports are in many cases formed by two shells, namely an upper shell and a lower shell. Depending on the design of the support structure, the shells are connected to certain sections or to one another largely peripherally by walls. The stiffness of such a support results from its modular design established in this manner.

Such supports can also be longitudinal members which are connected to one another by cross members and in this manner form an auxiliary frame. On the transverse sides of such an auxiliary frame, which are oriented transversely to the driving direction, for example, the front wheel suspension is connected by means of its transverse or triangular links. The connection of such links to the support structure is designed as an articulation. In many cases, in order not to weaken the support, the attachment points are arranged for the connection of, for example, a transverse link on the outer side of the support. The attachment points are provided by additional components which are connected to the support. The mounting space available in many cases in the area of the engine space of a vehicle is as a rule very limited especially in those areas in which front wheel supports are arranged. The design of the support in a shell design already requires a certain mounting space in order to achieve the desired stiffness, especially in relation to the height. The additional components for providing the attachment points accordingly increase the required mounting space.

In order to provide a remedy in that regard, it has been proposed in DE 20 2012 104 070 U1 to arrange at least one attachment point between the shells of the support so that the link to be connected thereto engages with a link connection part in the cutout and is connected to the attachment points provided by the upper shell and the lower shell. By this measure, the mounting space necessary for the accommodation of such a support structure is reduced in comparison to such designs in which the attachment points are fastened to the support. However, this measure has the consequence that such a support or the support structure provided therewith, implemented, for example, as an auxiliary frame, does not always exhibit the desired stiffness in the area of the attachment points. Such support structures are also known from US 2014/0265442 A1 and JP 2014-118093 A.

US 2012/0319389 A1 discloses an auxiliary frame for a wheel suspension. This previously known auxiliary frame comprises an upper part and a lower part, on which, at both ends located in vehicle transverse direction, particularly stiff lateral end pieces which are U-shaped in cross section are arranged. The opening of these lateral end pieces points in the vehicle transverse direction. The parallel arms of these components continue the plane of the upper part and of the lower part in transverse direction of the vehicle. Into the laterally open recess, a link associated with the vehicle suspension engages, and said link is connected to the arms of this component which face one another in vertical direction. The longitudinal extension of these two lateral end components determines the longitudinal extension of this known auxiliary frame in longitudinal direction of the vehicle. In the two longitudinal directions of the vehicle, these components protrude over the upper part and the lower part, resulting in a double T-shaped geometry in a top view of this auxiliary frame. This form is provided in order to save material and thus to reduce the weight of the auxiliary frame in this form.

SUMMARY

Proceeding from the forgoing, an aspect of the present disclosure is to develop a support structure mentioned above in such a manner that not only is the stiffness in the area of the attachment points improved, but that such a support structure can also be produced with just a small number of individual parts and presents a low deformation behavior due to the higher stiffness.

This aspect is achieved according to the present disclosure by a support structure according to the preamble, which was mentioned above, in which the two attachment points are provided for an attachment insert on each link attachment side of the support, wherein the attachment insert is connected to the shells, is open towards a link to be connected to the attachment points at least in the region of the attachment points, and is produced as a separate component, which attachment insert has an upper chord, a lower chord, and a back section connecting the upper chord to the lower chord, wherein the upper chord of the attachment insert is connected to the upper chord of the support, and the lower chord of the attachment insert is connected to the lower shell of the support, wherein link connection part receivers provided by the attachment insert are separated from the support cavity located between the upper and the lower shell by the back section.

In this support structure, on the attachment side or on the two attachment sides, the attachment points are provided in each case by an attachment insert produced as a separate component. The attachment insert is open in the direction of the link to be connected thereto and in particular at least in the area of the attachment points. Such an attachment insert comprises an upper chord, a lower chord and a back section connecting the two chords to one another. Such an attachment insert is connected with its upper chord to the upper shell of the support and with its lower chord to the lower shell of the support, typically by a joining connection, for example, by welding. Thus, such an attachment insert is inserted at least partially in the cavity provided between the upper shell and the lower shell of the support. The longitudinal extension of the support structure in the direction of the center longitudinal axis of the vehicle is defined by the upper and the lower shell. The back section of the attachment inserts separates, at least in the area of the link connection part receivers of the attachment insert, them from the cavity between the upper and the lower shell of the support. Preferably, the back section extends over the entire length of the attachment insert and follows its contour. This increases the stiffness of the support structure provided primarily by the two shells.

The provision of an attachment insert of this design, in order to provide the attachment points, confers to the support structure the desired stiffness in the area of the attachment points. This is achieved by simply implementing the attachment insert in the support structure. The attachment insert thus represents at the same time a stiffening insert on the respective link attachment side, which is itself designed as a support, due to its design with upper chord, lower chord and a back section connecting the two chords. In addition, it is advantageous that, due to the separate production of the attachment insert providing the attachment points, the attachment points, even with respect to one another, can be implemented with much narrower tolerance limits, in comparison to a design in which the attachment points are provided by the much larger support shells. In the attachment insert, the attachment points, typically implemented as through-holes, can be formed by a bore by a forming process, whereas, in conventional supports, in which the attachment points are introduced into the two shells, these attachment points were preconfigured before the upper shell and the lower shell were assembled with one another and connected in order to form the support.

An attachment insert as described above can be produced independently of the much larger shells. The attachment points can be introduced into the attachment insert component, which is relatively small compared to the support, when this component is finished with regard to its remaining geometry. Thus, the cooperating attachment points in the upper chord and in the lower chord of such an engagement lug can be produced to be in alignment with very narrow tolerances. Such an engagement lug can be produced to form a single piece out of a metal plate, typically a steel plate, via a deep drawing process. It is also possible to produce such an attachment insert, for example, from two shells which are connected to one another for the provision of the attachment insert.

Due to the use of the attachment inserts, the support structure, as a result of its higher stiffness, exhibits a lower deformation behavior and thus a higher moment of resistance.

This reinforcement or stiffening in the area of the link attachment sides of the support can be used in order to connect thereto additional components of the support structure, in particular components by which forces are to be absorbed or transferred, in particular without requiring other needed add-on mounting elements for the connection of such add-on components. Such add-on components can also be, for example, brackets considered to be flanges on which the vehicle engine can be supported. Due to their connection by the remaining components of the support structure, two brackets facing one another or the center longitudinal axis of the support (longitudinal direction in driving direction of the vehicle) can form a so-called pendulum rod. Here, the brackets represent connection projections of the pendulum rod, while the part connecting these brackets is provided by the auxiliary frame or the remaining components of the support structure itself. It is necessary that such brackets are connected in a particularly stable and rigid manner to the support of the support structure.

In a support structure as described above, the structure is reinforced in the area of the link attachment sides by the attachment inserts. This reinforcement can therefore be used for the connection of such brackets. According to an embodiment example, these brackets are connected to a portion of the back section of the attachment insert, for example, by means of a joining connection such as a welding connection. However, in the past the production of such pendulum rods entailed a considerably higher component cost, in particular with regard to the parts necessary for producing such a pendulum rod. The connection of such brackets to an attachment insert moreover results in an additional stiffening of the support structure in the area of the attachment points, so that this can be taken into consideration in the design of the attachment insert. In particular, in such a design, these two parts can be designed to optimize the weight.

The design of an attachment insert for the provision of the attachment points in such a support also allows a design of said attachment insert, in which such an attachment insert, in the area of the two link connection part receivers providing the attachment points, has a greater depth than in the section connecting the link connection part receivers. In a top view, such an attachment insert has a bone-shaped appearance, due to its end sections of broad design with the attachment points facing the center piece connecting these areas. The greater depth can also be provided by a corresponding design of the attachment insert or of its upper chord and its lower chord in the two transverse directions. A greater depth of the attachment insert in the area of the attachment points leads to a back section of contoured design, which, by means of a curved section, limits the link connection part receivers in the direction of the upper shell and of the lower shell of the support. Such a curve-shaped design additionally increases the stiffness in this area of the support.

In such an attachment insert, an attachment point is provided in each case by an upper attachment point in the upper chord and lower attachment point in the lower chord. These are typically formed by a through-hole. The area of the attachment insert forming the attachment point can be embossed, in particular both negatively and also positively. Such an embossing increases the stiffness in the attachment area of a link. The design of the embossing—positive or negative—is a function of the design of the support structure. Said design can also be different at the two attachment points of an attachment insert.

Welding seams, by means of which the attachment inserts are connected to the adjoining upper shell and the lower shell of the support, can also contribute to improving the stiffness of the support structure. In an embodiment example, it is provided that the upper shell and the lower shell have an attachment point contour corresponding to geometric design of the areas of the attachment points, whereby the length of a welding seam connecting the attachment insert to the respective shell on the upper chord or on the lower chord is enlarged. The attachment point contour preferably encloses in some sections the attachment point of the attachment insert, for example with a curved section, so that in this area the welding seam is led, for example, in a segment of an arc. This too has a positive effect on an improvement of the stiffness of the support in the area of the attachment points. If an attachment insert has an embossing in the area of its attachment points, the adjoining shell of the support is embossed in a corresponding manner. In other cases, the embossing of the attachment contour of the shells is designed so that it is led around the radius between the back section of the upper chord or lower chord and then comes in contact with the flat side of the respective chord. This embossing of the upper and/or lower shell of the support acts like a bead which in turn improves the stiffness of the support structure.

BRIEF DESCRIPTION OF THE DRAWINGS

Below, the present disclosure is described with an embodiment example in reference to the appended figures. The drawings show.

DETAILED DESCRIPTION

Figure 1:
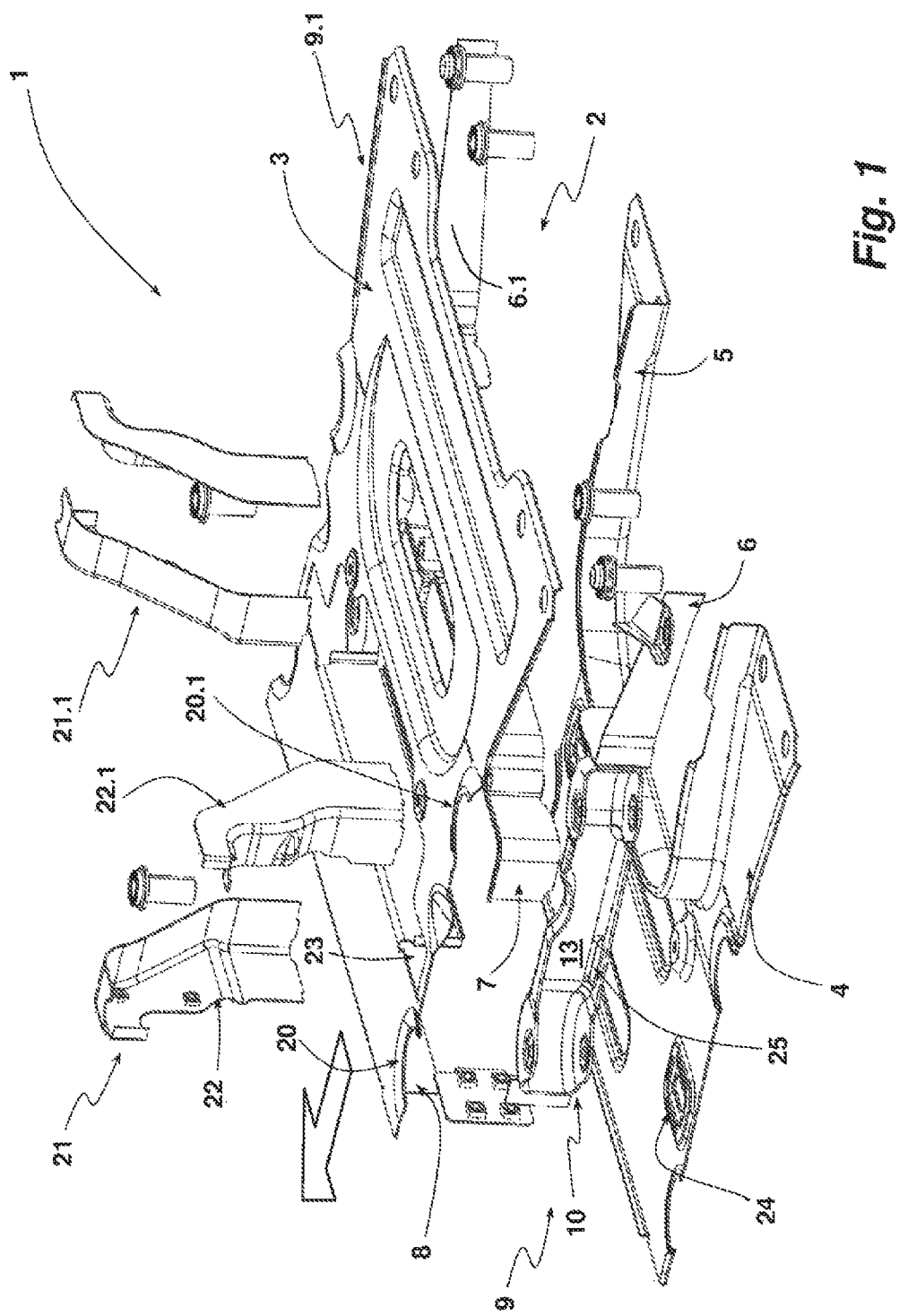
FIG. 1: a perspective representation of an exploded view of a support structure designed as an auxiliary frame for a vehicle.

A support structure 1, designed as an auxiliary frame for a motor vehicle, in particular a passenger car, comprises a support 2. This support 2 comprises an upper shell 3 and a lower shell 4. On the lower shell 4, a wall segment 5 beveled out of the plane of the lower shell 4 is formed. Together with additional wall segments 6, 6.1, 7 and a wall segment 8 formed on the upper shell 3, a box-like support is provided. The above-mentioned components are connected to one another by welding.

The orientation of the support structure 1 in the vehicle is shown by the block arrow pointing in the driving direction. The support 2 has two transverse sides. These transverse sides are link attachment sides 9, 9.1. These sides of the support 2 point transversely relative to the driving direction. The longitudinal direction of the link attachment sides 9, 9.1 follows the driving direction. On these sides, the attachment points for the connection of in each case one transverse link are provided. The attachment points on each link attachment side 9, 9.1 are provided by a respective attachment insert 10. The attachment inserts 10, as can be seen in FIG. 1, are separate components which, together with the upper shell 3, the lower shell 4 and the additional components are connected for the formation of the support structure 1 to the upper shell 3 and the lower shell 4 by welding connections.

Figure 2:
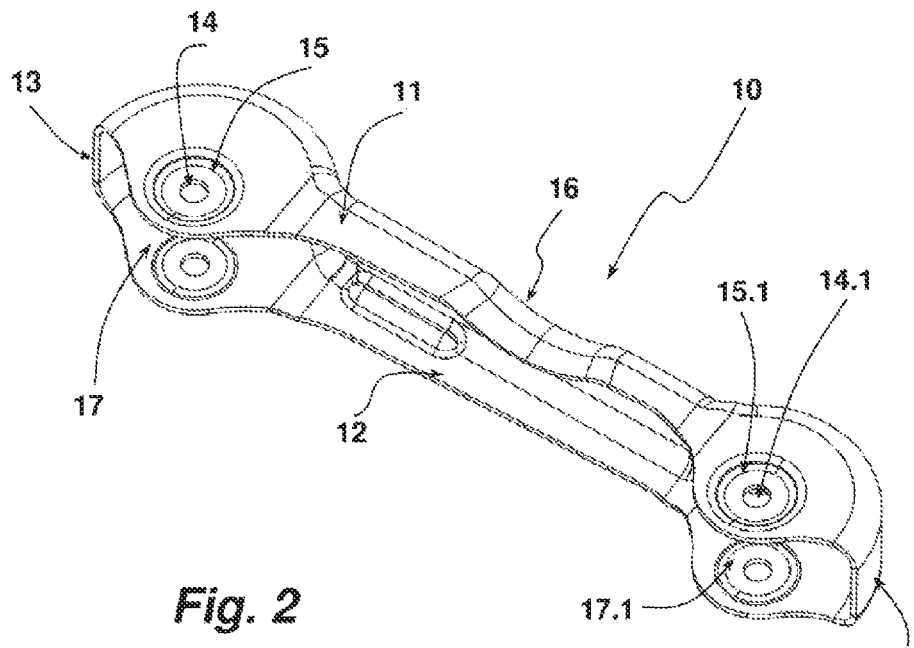
FIG. 2: an attachment insert as part of the support structure of FIG. 1 represented alone in a perspective top view.

An attachment insert 10 with more visible details is represented alone in the perspective representation of FIG. 2. The attachment insert 10 has an upper chord 11 and a lower chord 12. The two chords 11, 12 are connected to one another continuously by a back section 13 on their side pointing to the cavity between the upper shell 3 and the lower shell 4. The upper chord 11 and the lower chord 12 have a bone-shaped contour geometry (see FIG. 3). In the end sections having the greater depth, the attachment points 14, 14.1 are located for the connection of a transverse link. Each attachment point 14, 14.1 is formed by an upper attachment point and a lower attachment point, wherein the upper attachment point is implemented as a through-hole in the upper chord 11 and the lower attachment point is implemented as a through-hole in the lower chord 12. In the represented embodiment example, the through-holes are in each case located in an embossing 15, 15.1 which, in the embodiment example represented in the figure, are designed as negative embossings and thus as embossings pointing to the respective facing chord. By means of the embossings 15, 15.1 which are shown in FIG. 3 only on the upper chord 11 (the lower chord 12 too has corresponding embossings), the area of the attachment points 14, 14.1 is stiffened by a peripheral bead produced by the embossing.

The depth of the attachment insert 10 in the area of the attachment points 14, 14.1 is greater than its depth in the intermediate section 16. The attachment insert 10 is open in the direction of a transverse link to be connected. In the area of the attachment points 14, 14.1, link connection part receivers 17, 17.1 which are open in the direction of the transverse link are formed. The greater depth in the area of the link connection part receiver 17, 17.1 of the attachment insert 10 results in the bone-shaped contour geometry of the attachment insert 10 in a top view (see FIG. 3). In order for a transverse link not to have to engage too deeply between the upper shell 3 and the lower shell 4 of the support 2, the connection line 18 of the attachment points 14, 14.1 is located in front of the closure 19 of the attachment insert 10, which points outward and which at the same time represents in this regard the lateral closure of the support structure 1.

Figure 3:
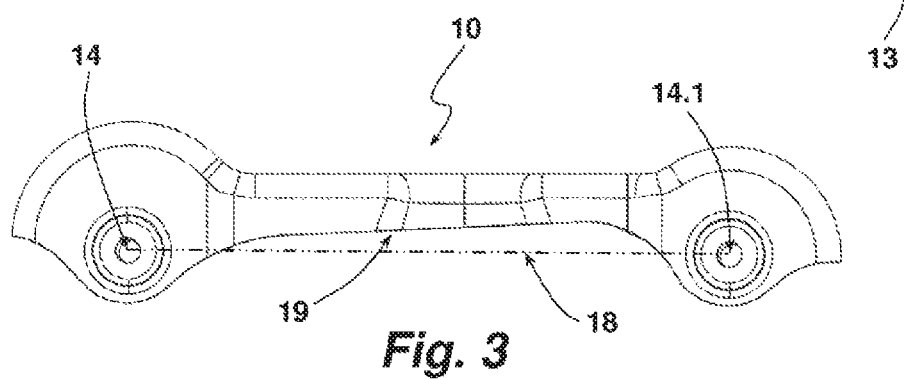
FIG. 3: the attachment insert of FIGS. 2 and 3 in a top view.
Figure 4:
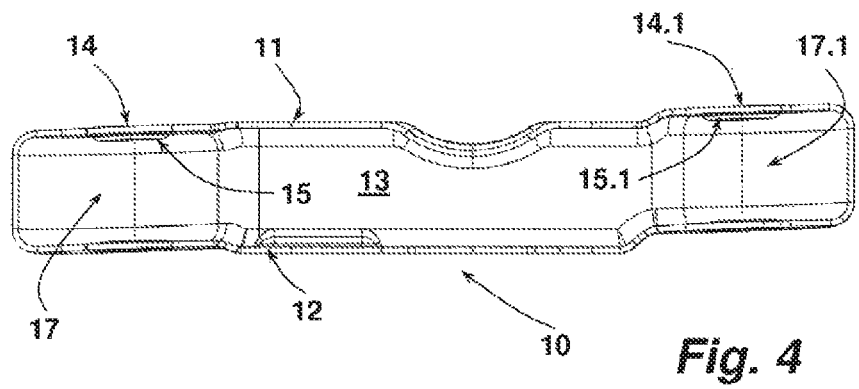
FIG. 4: the attachment insert of FIG. 2 in a side view.

FIG. 3 shows the attachment insert 10 in a side view, in particular into the two link connection part receivers 17, 17.1 and into the section 16 which is also open in this direction. The embossings 15, 15.1 of the attachment points 14, 14.1 can be clearly seen therein. The rest of the design of the attachment insert 10 is adjusted to the provided design of the support structure 1.

For the connection of the attachment insert 10, the upper shell 3 in each case has an attachment point contour 20, 20.1. The attachment point contours 20, 20.1 are adapted to the outer contour of the attachment insert 10, in particular in the transition from its back section 13 into the upper chord 11. Therefore, the attachment point contours 20, 20.1 are provided by an embossing. Accordingly, the lower shell 4 is also provided with attachment point contours.

Also, part of the support structure 1 are two brackets 21, 21.1 which, together with the remaining components of the support structure 1, form a pendulum rod. In the embodiment example represented, the bracket 21—the same applies to the bracket 21.1—is composed of two shells 22, 22.1. This bracket thus has a box-like design. The upper shell 3 has a recess 23 which is enclosed over its entire circumference, into which the bracket 21 is inserted. The shells 22, 22.1, at the lower closure of their side walls, each have a mounting extension which engages in corresponding recesses into the lower shell 4. The mounting area, on which the bracket 21 is mounted on the lower shell 4 and to which it is welded, is marked with reference numeral 24 in FIG. 1. For this mounting, use is made of the fact that the attachment insert 10 inserted with engagement between the upper shell 3 and the lower shell 4 and thus in the cavity delimited by the two shells 3, 4 in the vertical direction. Thereby, it is achieved that the mounting area 24 directly adjoins the back section 13 of the attachment insert 10. It is provided that the surface of the section of the bracket 21 inserted in the upper shell 3, which surface points to the attachment insert 10, adjoins the back section 13 of the attachment insert 10. To make this possible in spite of the bead-shaped reinforcement of the mounting area 24, the attachment insert 10 has an embossing 25 at this site (see FIG. 2).

Figure 5:
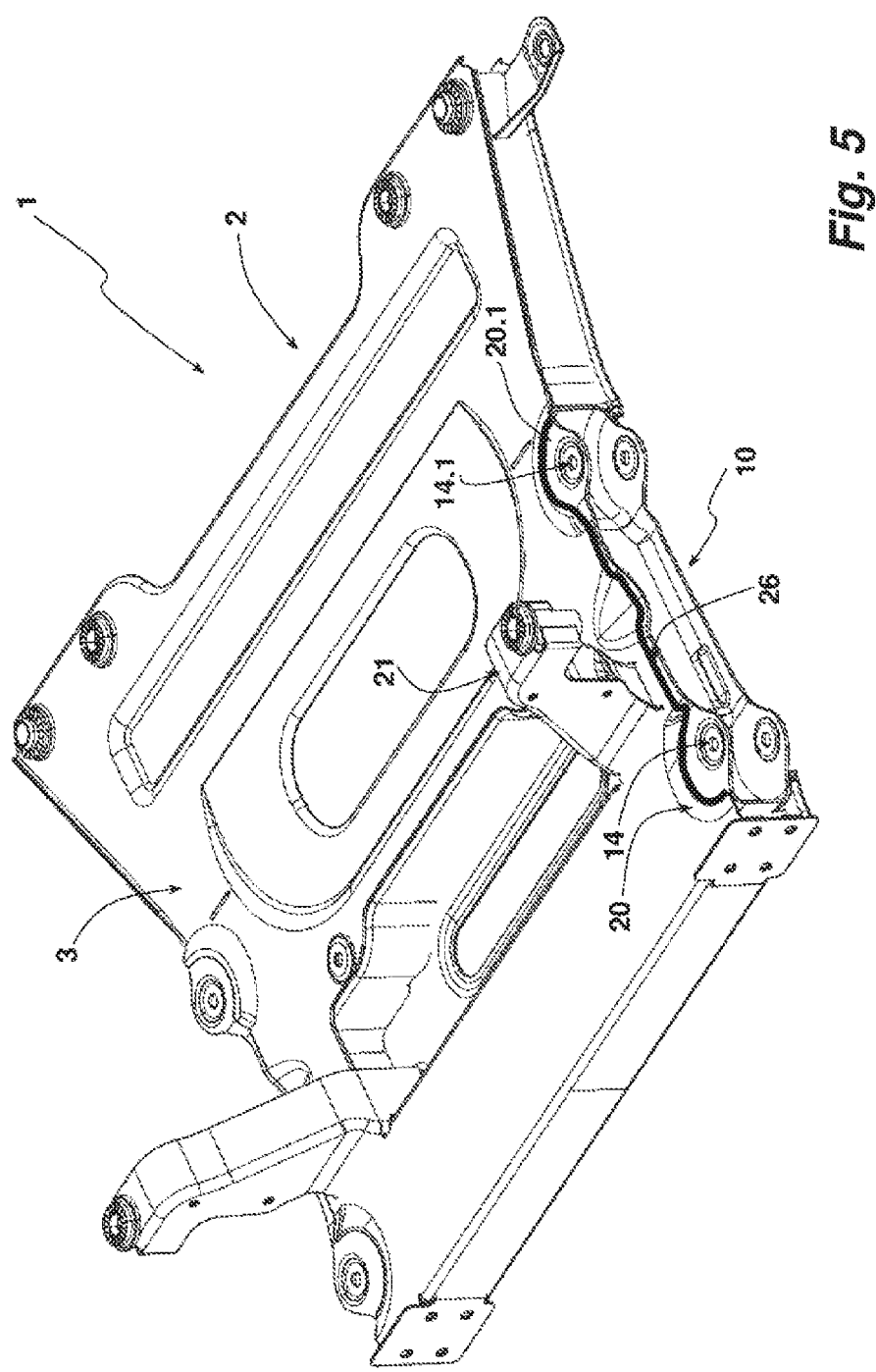
FIG. 5: a perspective representation of the support structure.

The perspective view of the support structure 1 in FIG. 5 shows the implementation of the attachment insert 10 between the upper shell 3 and the lower shell 4 of the support 2. It can be seen clearly in this figure that the attachment inserts 10 are inserted between the upper shell 3 and the lower shell 4. The longitudinal extension of the support structure 1 is defined by the upper shell 3 and the lower shell 4. The longitudinal extension of the attachment inserts 10 corresponds to only a fraction of the longitudinal extension of the support structure 1. With its attachment point contours 20, 20.1, the upper shell 3 encloses in some areas the attachment points 14, 14.1 and thus the embossings 15, 15.1 forming said attachment points. The attachment insert 10 is connected to the upper shell 3 by means of a welding seam 26 led over the entire length. In the same manner, the attachment insert 10 is connected to the lower shell 4. The support structure 1 thus has a particular stiffness in the area of the attachment insert 10. This stiffness is sufficient in order to connect the bracket 21 thereto as an attachment extension for the pendulum rod function. This moreover increases the stiffness of the support structure 1, so that this measure achieves an additional stiffening of the link attachment sides 9, 9.1. To that extent, the stiffening by means of the attachment insert 10 is advantageous for the transverse link attachment and also advantageous for the attachment of a bracket 21, 21.1.

Figure 6:
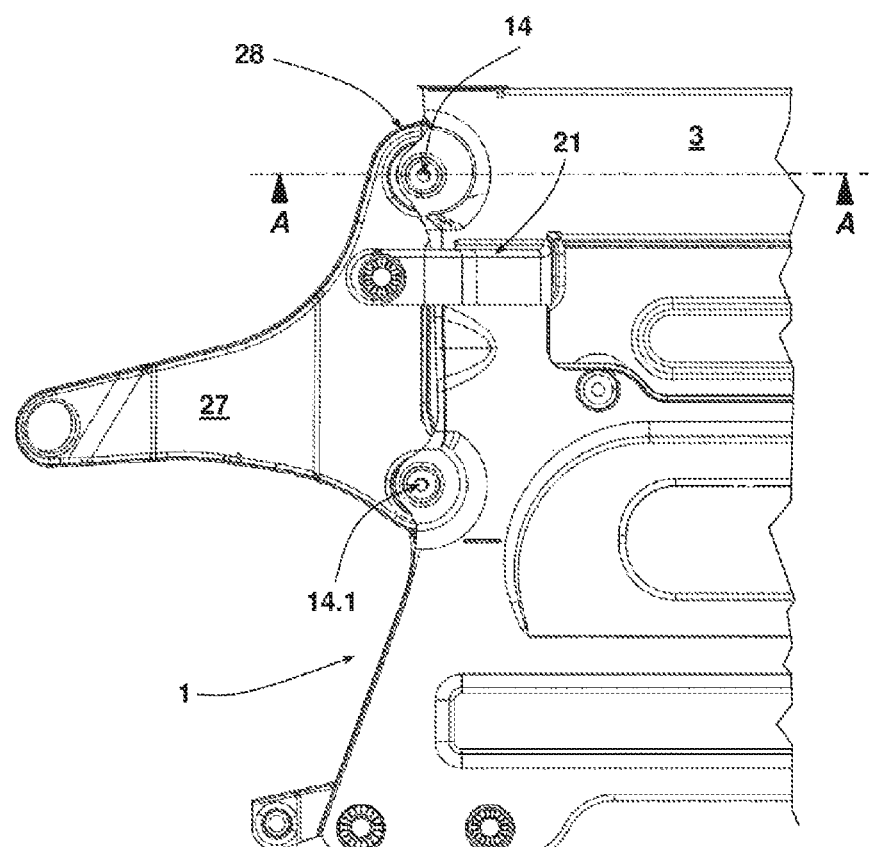
FIG. 6: a top view on the support structure of FIG. 6 with a transverse link connected thereto on one side.
Figure 7:
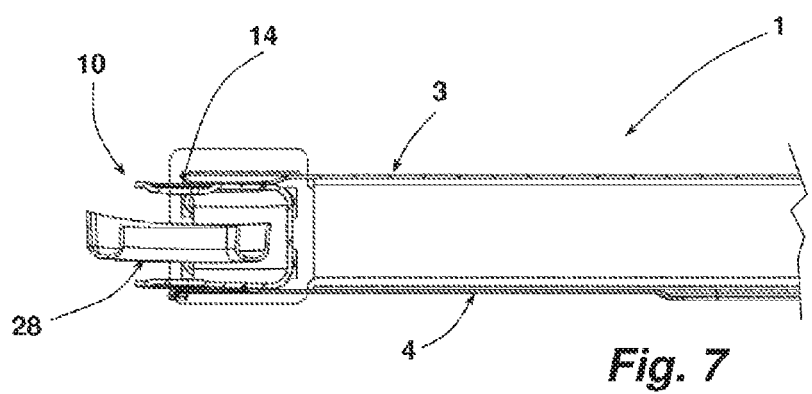
FIG. 7: a section through the support structure of FIG. 7 with the transverse link connected thereto along line A-A of FIG. 7.

FIG. 6 shows the support structure 1 in a top view with a transverse link 27 connected thereto. Said transverse link is connected in each case by means of an attachment part 28, 28.1 to the attachment point 14 or 14.1 in a manner not shown in greater detail. The engagement of the attachment part 28 in the link connection part receiver 17 of the attachment insert 10 is shown in the cross-sectional representation of FIG. 7. The concrete mechanical connection with the articulation is not shown to simplify the drawing in FIG. 7.

In a development not represented in the figures, it is provided that the connections of the upper shell and of the lower shell on the link attachment side in each case have an angular deflection directed apart from one another, just like the upper chord and the lower chord of the attachment insert. This measure results in a further stiffening of the support structure in the area of the link attachment sides.

The present disclosure has been explained in reference to an embodiment example. The person skilled in the art can conceive of numerous other designs, without leaving the scope of the valid claims, in order to be able to implement the present disclosure in the context of the claims.

LIST OF REFERENCE NUMERALS

1 Support structure
2 Support
3 Upper shell
4 Lower shell
5 Wall segment
6, 6.1 Wall segment
7 Wall segment
8 Wall segment
9, 9.1 Link attachment side
10 Attachment insert
11 Upper chord
12 Lower chord
13 Back section
14, 14.1 Attachment point
15, 15.1 Embossing
16 Section
17, 17.1 Link connection part receiver
18 Connection line
19 Closure
20, 20.1 Attachment point contour
21, 21.1 Bracket
22, 22.1 Shell
23 Recess
24 Mounting area
25 Embossing
26 Welding seam
27 Transverse link
28 Connection projection

The invention claimed is:

1. A support structure for a vehicle, comprising:
a support, which has an upper shell, a lower shell, and attachment inserts produced as separate components, with an extension of the support structure in a longitudinal direction of the vehicle being defined by an extension of the upper and lower shells in said longitudinal direction, and comprising attachment points on link attachment sides of the support for connecting a link,
wherein a front attachment point and a rear attachment point are provided on each link attachment side,
wherein the front and rear attachment points are provided by one attachment insert on each link attachment side of the support,
wherein each attachment insert is connected to the shells and is open towards a link to be connected to the attachment points at least in a region of the attachment points,
wherein each attachment insert has an upper chord, a lower chord, and a back section connecting the upper chord to the lower chord,
wherein the upper chord of the attachment insert is connected to the upper shell of the support, and the lower chord of the attachment insert is connected to the lower shell of the support,
wherein two link connection part receivers provided by the attachment insert are separated from a support cavity located between the upper and lower shells by the back section, and
wherein the depth of the attachment insert in the area of the two link connection part receivers providing the attachment points is greater than in the section connecting the two link connection part receivers.

2. The support structure of claim 1, wherein the attachment points of the attachment inserts in each case are provided by an upper attachment point in the upper chord and a lower attachment point in the lower cord.

3. The support structure of claim 2, wherein the attachment points are designed as through-holes.

4. The support structure of claim 3, wherein the upper and lower attachment points of an embossing of the upper chord and of the lower chord are arranged.

5. The support structure of claim 3, wherein a connection line of the two attachment points of an attachment insert extends on the outside and with separation from the outer closure of the section connecting the two link connection part receivers.

6. The support structure of claim 2, wherein the upper and lower attachment points of an embossing of the upper chord and of the lower chord are arranged.

7. The support structure of claim 6, wherein the back section divides a chamber provided by the upper chord and lower cord of the attachment insert continuously from the support cavity located between the shells of the support.

8. The support structure of claim 7, wherein the attachment point contours of the shells of the support are embossed in accordance with a respective adjoining embossing of the attachment insert.

9. The support structure of claim 8, wherein at least one shell of the support comprises a recess for the insertion of a section of a bracket protruding from a plane of the support, and this recess with one of its delimitation sides extends in alignment with the back section of the attachment insert, so that the section of the bracket engaging in the recess comes in contact at the back section and is joined to it.

10. The support structure of claim 8, wherein the at least one attachment insert is a deep drawn steel plate part.

11. The support structure of claim 8, wherein the support structure is an auxiliary frame.

12. The support structure of claim 6, wherein a connection line of the two attachment points of an attachment insert extends on the outside and with separation from the outer closure of the section connecting the two link connection part receivers.

13. The support structure of claim 2, wherein a connection line of the two attachment points of an attachment insert extends on the outside and with separation from the outer closure of the section connecting the two link connection part receivers.

14. The support structure of claim 13, wherein, in a top view, the attachment insert has a bone-shaped outer contour.

15. The support structure of claim 1, wherein the back section divides a chamber provided by the upper chord and lower cord of the attachment insert continuously from the support cavity located between the shells of the support.

16. The support structure of claim 1, wherein the upper shell and the lower shell of the support have an attachment point contour, which, on the sides of the upper chord and of the lower chord pointing upward and downward, respectively, enclose an area around an attachment point of the adjacent attachment insert and that the attachment point contours are welded to the adjacent engagement insert following the attachment point contour.

17. The support structure of claim 16, wherein the attachment point contours of the shells of the support are embossed in accordance with a respective adjoining embossing of the attachment insert.

18. The support structure of claim 1, wherein at least one shell of the support comprises a recess for the insertion of a section of a bracket protruding from a plane of the support, and this recess with one of its delimitation sides extends in alignment with the back section of the attachment insert, so that the section of the bracket engaging in the recess comes in contact at the back section and is joined to it.

19. The support structure of claim 1, wherein the at least one attachment insert is a deep drawn steel plate part.

20. The support structure of claim 1, wherein the support structure is an auxiliary frame.

* * * * *